United States Patent
Jha et al.

(10) Patent No.: US 12,443,742 B2
(45) Date of Patent: Oct. 14, 2025

(54) RATE-LIMITED MECHANISM FOR QUERYING A NON-TABULAR DATABASE

(71) Applicant: Hewlett Packard Enterprise Development LP, Spring, TX (US)

(72) Inventors: Ravi Shekhar Jha, Galway (IE); Eoghan Shields, Galway (IE)

(73) Assignee: Hewlett Packard Enterprise Development LP, Spring, TX (US)

( * ) Notice: Subject to any disclaimer, the term of this patent is extended or adjusted under 35 U.S.C. 154(b) by 345 days.

(21) Appl. No.: 18/172,276

(22) Filed: Feb. 21, 2023

(65) Prior Publication Data

US 2024/0281554 A1 Aug. 22, 2024

(51) Int. Cl.
*G06F 21/62* (2013.01)
*G06F 16/245* (2019.01)

(52) U.S. Cl.
CPC ........ *G06F 21/6227* (2013.01); *G06F 16/245* (2019.01)

(58) Field of Classification Search
CPC .............. G06F 21/6227; G06F 16/245
See application file for complete search history.

(56) References Cited

U.S. PATENT DOCUMENTS

| | | | | |
|---|---|---|---|---|
| 8,681,630 | B1* | 3/2014 | Gibson | H04L 67/62 370/235 |
| 2006/0004708 | A1* | 1/2006 | Hartmann | G06F 16/9538 |
| 2006/0020581 | A1* | 1/2006 | Dettinger | G06F 21/604 707/999.009 |
| 2015/0142783 | A1* | 5/2015 | Bruce | G06F 16/27 707/722 |
| 2017/0223119 | A1* | 8/2017 | Harding | H04W 4/021 |
| 2019/0228095 | A1* | 7/2019 | Ergun | G06F 16/248 |
| 2020/0192706 | A1* | 6/2020 | Huus | G06F 16/245 |
| 2022/0247686 | A1* | 8/2022 | Rajagopalan | H04L 67/51 |
| 2024/0275730 | A1* | 8/2024 | Black | H04L 47/20 |

\* cited by examiner

*Primary Examiner* — Mohamed A. Wasel

(74) *Attorney, Agent, or Firm* — Hewlett Packard Enterprise Patent Department

(57) ABSTRACT

Techniques for querying a nontabular database in a Containers-as-a-Service (CaaS) platform including using rate-limited mechanisms. A keeper service receives a vendor-specific request with a query path, validates it against predefined paths, and determines a parameter for rate-limit calculation. The request is translated into a vendor-neutral query command if the rate limit has not been reached, and then executed to access the database.

17 Claims, 6 Drawing Sheets

RATE-LIMITED MECHANISM FOR QUERYING A NON-TABULAR DATABASE

BACKGROUND

Containers-as-a-Service (CaaS) is a platform of container-based virtualization where container engines, orchestration and the underlying computing resources are delivered to users as a service from a CaaS provider. A CaaS platform manages containers at a large scale, including starting, stopping, and organizing containerized workloads. A CaaS platform often has a plurality of applications running simultaneously in a plurality of containers launched by the applications.

A Denial of Service (DoS) attack is a type of cyber-attack that aims to make a website or online service unavailable by overwhelming it with traffic from a single source. The attacker sends a large amount of traffic to the target, overwhelming the server and making it impossible for the server to handle the incoming requests, resulting in a denial of service for legitimate users.

BRIEF DESCRIPTION OF THE DRAWINGS

Various objects, features, aspects and advantages of the inventive subject matter will become more apparent from the following specification, along with the accompanying drawings in which like numerals represent like components.

Figure 1:
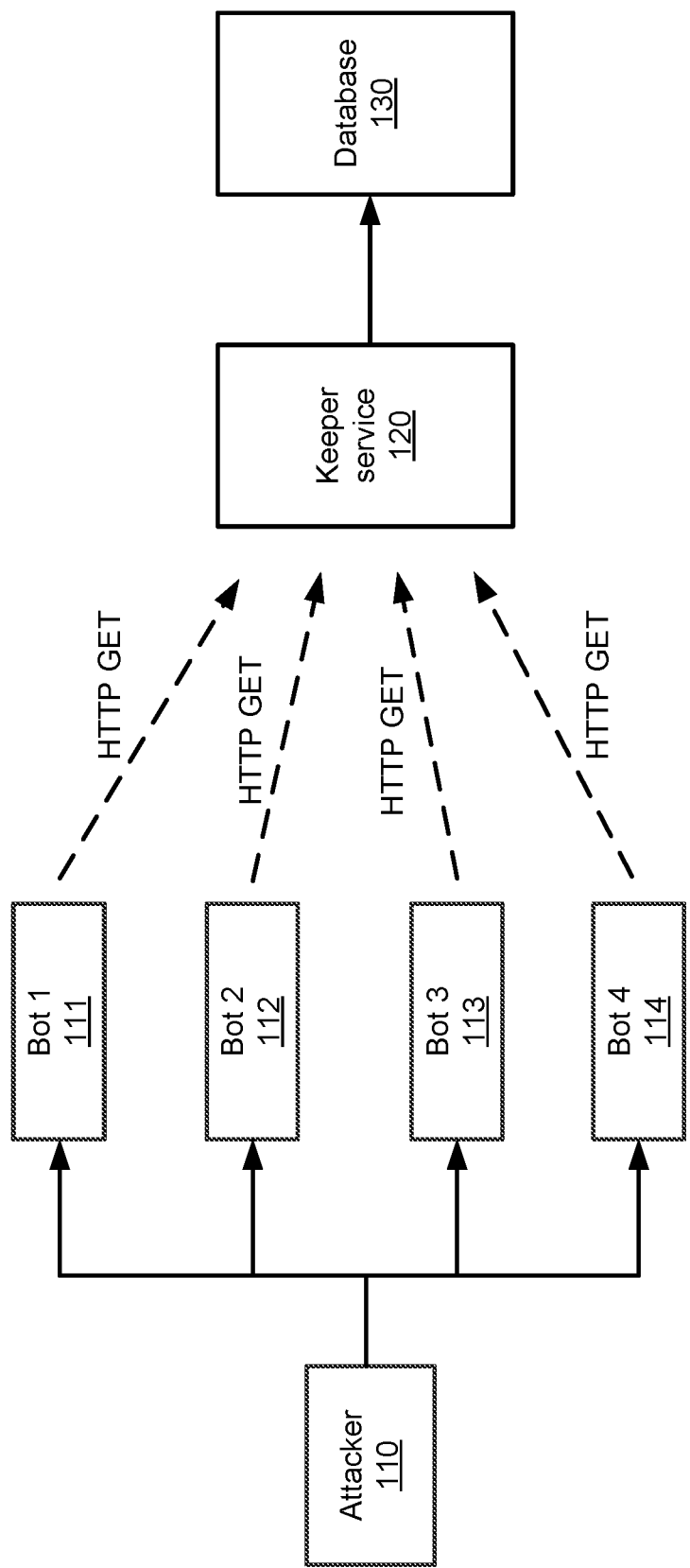
FIG. 1 illustrates an example diagram of Distributed Denial of Service (DDoS) attack.

While the examples are described with reference to the above drawings, the drawings are intended to be illustrative, and other examples are consistent with the spirit, and within the scope, of the various examples herein.

DETAILED DESCRIPTION

In some CaaS platforms, performance data of containers and applications running in the containers are monitored and aggregated by CaaS monitoring tools. The performance data may then be stored in a non-tabular database, also referred to as a NoSQL database. To view the stored performance data, or on some occasions, to modify the stored performance data, the non-tabular database needs to be accessed by the users and developers of the CaaS platform.

Existing solutions for CaaS platform users and developers to access the stored performance data face several challenges. Some existing solutions allow developers to create microservices, which can run within the NoSQL database with native access to in-memory data. However, developers from different teams may end up developing similar or redundant microservices for achieving the same or similar functions, resulting in waste of manpower and redundant computing resources.

Another challenge some existing solutions face is data security. Allowing unrestricted access to NoSQL database data may pose data security issues. Through the microservices running in the NoSQL database, developers or users may have unrestricted access to not only the performance data, but also other data in the database that are more private or secure. Developers or users may also have unlimited query options to the database, which allow them to modify and delete data in the database. Developers or users who are unfamiliar with certain features specific to a NoSQL database may inadvertently overwrite or erase useful performance data or other private data stored in the database, or may inadvertently prevent other users from accessing the performance data which other users have right to access.

Some existing solutions face yet another challenge. It is difficult to effectively restrict user's access to the NoSQL database to prevent it from being overloaded due to heavy read/write operations or Denial of Service (Dos) attacks. In a CaaS platform, hundreds or thousands of containers, along with applications running in the containers, are being started, restarted, or destroyed at any given moment. In order to store the performance data of these containers and applications in real time, hundreds of thousands of messages containing performance data are being stored in the NoSQL database in real time. The NoSQL database may also need to handle other tasks related to other modules of the CaaS platform. Accordingly, NoSQL database in a CaaS platform routinely handles very heavy data traffic. Therefore, a user's additional read/write operations and queries to the database, if unrestricted, may overload the database and cause the system to collapse. Furthermore, a Denial of Service attack from malicious attackers may also overload the database and cause the system to collapse.

Nevertheless, it is difficult to restrict a user's access to a NoSQL database under the existing solutions. In some existing solutions, developers from different teams are allowed to create their own microservices. Microservices run within a NoSQL database to access performance data in the same database. It is impractical for each individually run microservice to accurately keep track of the database read/write commands generated by other microservices in real time. Lacking the ability to accurate track the database's workload in real time, it is difficult for each individual microservice to calculate whether the database's rate limit has been reached, and thereby determine if the read/write command initiated by its own users should be allowed or denied.

The present disclosure is directed to methods and systems for providing Application Programming Interface (API) services with rate-limited mechanism to query a non-tabular database in a CaaS platform. The disclosed techniques provide one API for all the developer teams and users to use, thus offering more uniformity and scalability of the service. The disclosed techniques implement more controlled access to a NoSQL database in a CaaS platform with limited query options. The disclosed techniques also provide ways to calculate the rate limit of the NoSQL database and to prevent the database from being overloaded due to heavy read/write operations or DoS attacks. As a result, the disclosed techniques greatly improve the efficiency and capability of querying a non-tabular database while using a rate-limited mechanism.

According to an example, a vendor-specific request to access a database is received by a keeper service, where the vendor-specific request comprises a query path. The query path is validated by the keeper service as one of a plurality of predefined query paths. Based on the validation, a parameter representing the vendor-specific request is determined by the keeper service to incorporate into a rate-limit calculation. The rate-limit calculation is performed by the keeper service based on the parameter representing the vendor-specific request. The keeper service determines that a rate limit of the vendor-specific request has not been reached based on the rate limit calculation. Based on the determination that the rate limit of the vendor-specific request has not been reached, the vendor-specific request is translated by the keeper service into a vendor-neutral query command based on a type of the database. The vendor-neutral query command is executed, where the vendor-neutral query command provides access to the database.

In some examples, where the vendor-specific request further comprises a query label, translating, by the keeper service, the vendor-specific request into the vendor-neutral query command further comprises, determining that the query label is one of a plurality of predefined query labels, and translating the query label into the vendor-neutral query command based on the determination that the query label is one of the plurality of predefined query labels.

In some examples, the plurality of predefined query paths comprises at least a root path, a config query path, an open query path, or an update path. In some examples, if the rate limit of the vendor-specific request has been reached, an indication is generated to indicate that the rate limit of the vendor-specific request has been reached.

In a CaaS environment, containers are packaged with necessary application code, libraries, dependencies, and system tools to run on a variety of platforms and infrastructure. Container orchestration automates the scheduling, deployment, networking, scaling, health monitoring, and management of containers. A platform that uses container orchestration to manage containers is also referred to as a container orchestration engine, a container orchestration platform, a container orchestration environment, or a container orchestration tool in the industry and throughout this disclosure.

An example method of container orchestration is based on a swarm. A swarm is a collection of physical or virtual machines that have been configured to join together in a cluster. A typical swarm has at least one manager node and many worker nodes. A manager node is used to dispatch tasks to worker nodes. Worker nodes receive tasks from manager nodes and execute required actions for the swarm, such as starting or stopping containers, which run in worker nodes. A containers may have one or more applications running in the container.

A worker node may execute monitoring applications to capture the performance data of the containers running in the worker node, as well as the performance data of the applications running in all the containers of the worker node. The performance data is gathered at runtime and stored in a database. After the performance data is stored, a separate API service (hereinafter referred to as a "Keeper service") may be used to retrieve the performance data from the database for display and analysis.

In a CaaS platform, hundreds or thousands of containers and applications may be started and executed at any given moment. As a result, a large amount of performance data may be generated and stored in real time. Therefore, the database may be heavily burdened with a large number of write operations that need to be processed. The database may be overloaded or crashed if, at the same time, it also needs to process a large number of read operations requested by database users. Thus, a mechanism is needed to protect the database against a burst of read/write operations in a short period of time. Furthermore, the mechanism can also be used to protect the database from malicious Denial of Service (DoS) attacks, or Distributed Denial of Service (DDoS) attacks.

FIG. 1 illustrates an example diagram of a Distributed Denial of Service (DDoS) attack. In FIG. 1, DDoS attacker 110 orchestrates an attack against keeper service 120 and database 130. Keeper service 120 is an API or web service provider providing generic API or HTTP service for network users to access the data stored in database 130. In this configuration, users cannot directly access database 130. They may access database 130 via keeper service 120.

DDoS attackers often leverage the use of a botnet, illustrated as multiple bots 111, 112, 113 and 114, to carry out large scale attacks. Bots 111-114 are a group of hijacked internet-connected devices such as computers, routers, network devices, and other endpoints. Attacker 110 takes advantage of security vulnerabilities of these bots and control them using command and control software. Once in control, attacker 110 can command the bots to conduct DDoS attack on keeper service 120 and database 130.

There are many types of DDoS attacks. One type of DDoS attack is an application layer attack. An application layer attack may include a low-and-slow attack, a slow read attack, an HTTP flooding attack, etc. These attacks mainly target web servers and databases. The attack depicted in FIG. 1 is an HTTP flooding attack. Each bot repeatedly sends out what appear to be legitimate HTTP GET or POST requests to keeper service 120. The attack is designed to cause keeper service 120, and eventually database 130, to allocate the most resources possible in direct response to each request from each bot. In this way, attacker 110 hopes to overwhelm database 130, "flooding" it with as many process-intensive requests as possible. The ultimate goal of the attack is to crash database 130. The magnitude of the attack is measured in requests per second (RPS). RPS of a DDoS attack may range from 50 requests per second to the order of tens of millions requests per second.

Figure 2:
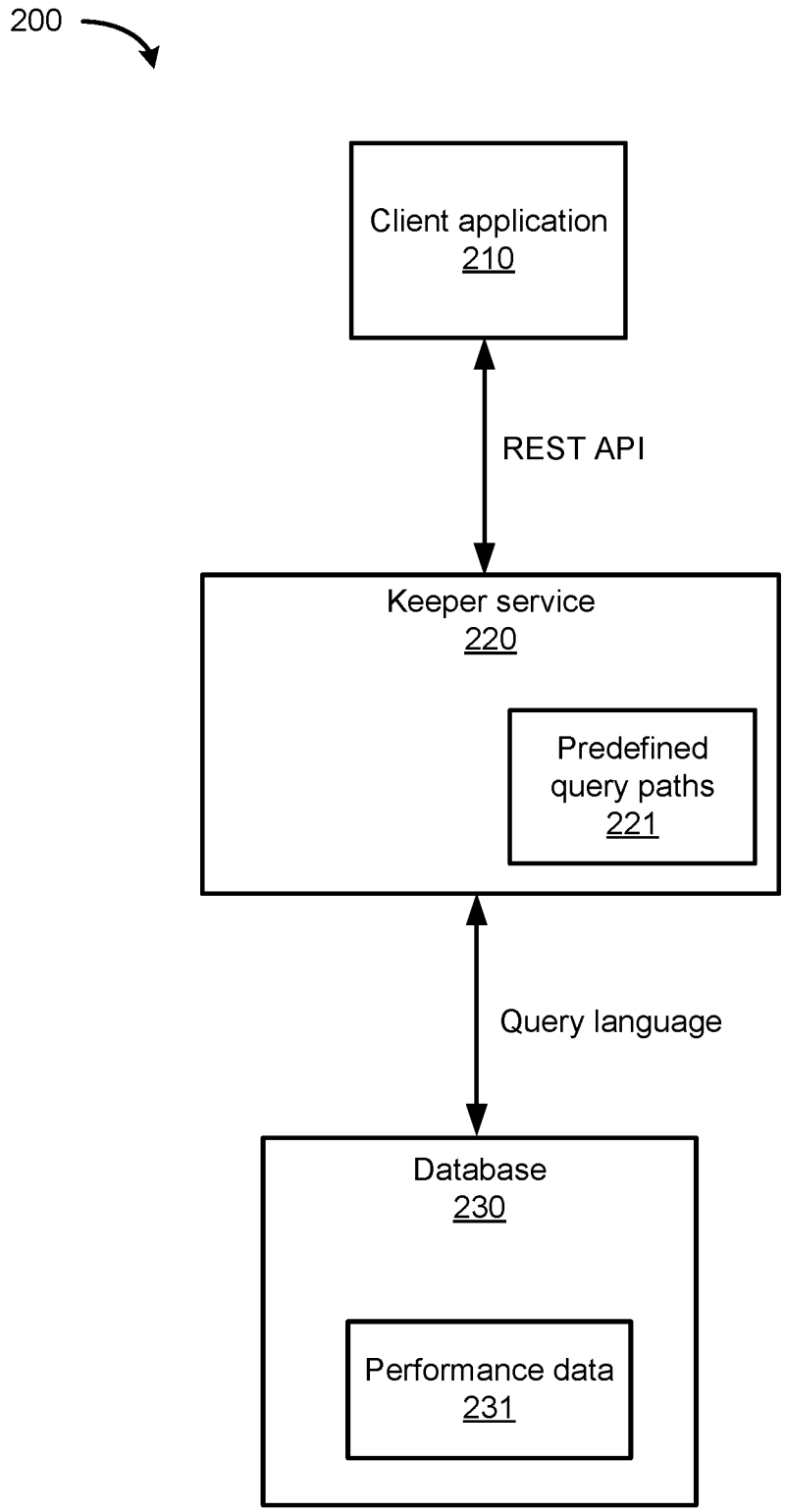
FIG. 2 illustrates an example system diagram of a keeper service using rate-limited mechanism for querying a non-tabular database.

FIG. 2 illustrates an example system diagram of a keeper service using rate-limited mechanism for querying a non-tabular database. System 200 comprises client application 210, keeper service 220 and database 230. Client application 210 may be used by CaaS platform users to configure the deployment of containers and applications running in the containers. Client application 210 may also provide CaaS platform users with user interfaces to view the status and details of the containers and applications running in the platform, and to view the performance metrics monitored and aggregated by CaaS monitoring tools. Client application 210 may run on a variety of operating environments using languages such as Java, JavaScript, Python, Go, Groovy, Bash, etc. Client application 210 communicates with keeper service 220 via API. More than one client application may communicate with keeper service 220 via API. In some examples, a large number (e.g., thousands) of client applications communicate with keeper service 220 at the same time.

Keeper service 220 is an API service provider that provides client application 210 with a generic application programming interface for accessing performance data 231 stored in database 230 by CaaS monitoring tools. Keeper service 220 may run on a server. Keeper service 220 provides a database querying service to client application 210. The service is provided independent of the operating environment employed by the client application. In system 200, keeper service 220 acts as a gatekeeper of database 230. Access to performance data 231 stored in database 230 can only be made via keeper service 220. Keeper service 220 also protects database 230 by implementing a rate-limited mechanism to limit user's access to the database and to prevent DDoS attacks.

Database 230 may be a relational database, or a non-relational database (also referred to as a non-tabular database) such as the MongoDB® developer data platform or ArangoDB® open-source native graph database system. Database 230 stores performance data 231, which is aggregated by CaaS monitoring tools. Depending on the type of the database, database 230 may be accessed using database query languages such as Structured Query Language (SQL), XQuery, ArangoDB® Query Language (AQL), or MongoDB® Query Language (MQL), etc. Database 230 may also be accessed using database command, database protocol, or application programming interface (API).

The communication between client application 210 and keeper service 220 is in the form of API. Depending on the scope of usage of system 200, the API may be an Internal API, which is hidden from external users and only exposed to internal systems. It may be a Partner API, which is available to users within the same company or users of third-party partners. It may also be an Open API, which is available to other non-platform or public users.

As depicted in FIG. 2, the API protocol between client application 210 and keeper service 220 is REST (Representational State Transfer) API. However, the API protocol may also be of other types, such as, SOAP (Simple Object Access Protocol) API, or Remote Procedure Call (RPC), etc. The data format used by REST API to communicate between client application 210 and keeper service 220 could be JSON (JavaScript Object Notation). However, other types of data format may also be used, such as XML (Extensible Markup Language), HTML (Hyper-Text Markup Language), plain text, etc.

To access database 230, client application 210 sends a vendor-specific user request to keeper service 220. The user request may vary depending on the type of API protocol used or the request data sent in the request body. The user request, if sent in REST format, contains at least one of the following: an HTTP method, an endpoint path, headers and a request body. The HTTP method of the user request acceptable by keeper service 220 is POST. However, other HTTP methods, such as GET, PUT, DELETE, etc., may also be implemented and accepted by keeper service 220. The headers of the user request may contain authentication data, such as an API key, and/or information of content type, such as JSON.

The endpoint path of the user request contains a Uniform Resource Identifier (URI), which identifies a resource of keeper service 220 by its location, name, or both. In most cases, the URI of each resource of keeper service 220 is the Unique Resource Location (URL) of that resource. The resources of keeper service 220 may include, but not limited to, root, config query, open query, and update. These resources may also be viewed as predefined functions or services provided by keeper service 220 for client application 210 to call. The endpoint path of these resources incorporates the network address of keeper service 220 and the name of the resources. For example, assuming the network address of keeper service 220 is 10.0.0.1, the endpoint path of the root resource would be "https://10.0.0.1/". The endpoint path of the config query resource would be "https://10.0.0.1/configquery". For the open query resource, the endpoint path would be "https://10.0.0.1/openquery". For the update resource, the endpoint path would be "https://10.0.0.1/update". An endpoint path without the URL scheme ("https://") and the network address is also referred to as the "query path" throughout this disclosure. Accordingly, the predefined query paths of keeper service 220 include: "/" for root path, "/configquery" for config query path, "/openquery" for open query path, and "/update" for update path. These paths are stored in predefined query paths 221 unit in keeper resource 220 on a non-transitory computer-readable medium. In some examples, keeper service 220 may include other predefined query paths. In some examples, the user request acceptable by keeper service 220 may also include path parameters, or query parameters, or both.

The request body of the user request contains request data, which is the data sent by client application 210 to keeper service 220 in JSON format. It is also called a JSON payload. The structure and content of the request data varies depending on the resources called by the request. For example, if the root resource is called, the request data may be empty. If the config query resource is called, the request data further contains a query label.

After keeper service 220 receives the user request from client application 210 containing a query path, keeper service 220 first checks if the query path is one of the predetermined query paths stored in predetermined query paths 221. If not, keeper service 220 will generate an indication to client application 210 indicating the same. For example, an indication that the query path is not one of the predefined query paths will be generated if an endpoint path of a user request is "https://10.0.0.1/privatequery", entailing a query path to be "/privatequery", which is not one of the predetermined query paths. Keeper service 220 validates the query path if the query path is in fact one of the predetermined query paths. If the query path is one of the predetermined query paths, the query path will be validated.

If the query path is validated, keeper service 220 determines a parameter of the user request to incorporate into a rate-limit calculation. A parameter of the user request may include the type of the user request, the IP address of client application 210, the time lapse between each user request, or a total number of user requests from client application 210 within a given timeframe, etc. Rate-limited mechanism is used to control the rate of request received by keeper service 220 and/or database 230 to prevent the database being overloaded or to prevent DDoS attacks. Rate-limit calculation by keeper service 220 may calculate the amount of time between each user request from client application 210 and other client applications. The rate-limit calculation may also calculate the total number of requests from all client applications within a given timeframe. If there are too many requests within the given timeframe, keeper service 220 will deny or not fulfill the user request, and may do so for a certain amount of time.

Rate-limit calculation by keeper service 220 may also be based on the type of user request, or query path. For example, keeper service 220 may limit a total number of "open query" requests from client application 220 within a given timeframe. The rate-limit calculation may also be based on the workload of database 230, measured by the type of query command or the total number of query commands sent to the database in a given timeframe. This is to prevent database 230 from being overloaded by a large number of read/write query commands.

Based on the determined parameter of the user request, keeper service 220 performs the rate-limit calculation. If keeper service 220 determines that the rate limit of the user request has been reached, for example, the rate limit exceeds a predetermined rate-limit threshold, keeper service 220 will generate an indication to client application 210 indicating the same. In some examples, the rate-limit threshold may be predetermined at 20 request per second (RPS). To protect keeper service 220 and database 230 from DDoS attacks, the threshold value of the rate-limit may be determined so that it is lower than the lowest RPS of a potential DDoS attack. In some examples, if the rate limit has been reached, keeper service 220 may generate an indication to client application 220, and/or other client applications in the network, that the keeper service is experiencing a denial-of-service attack. Keeper service 220 may also deny or not fulfill the user request. If keeper service 220 determines that the rate limit of the user request has not been reached, keeper service 220 will translate the user request into a vendor-neutral query command based on the type of the database. For example, if database 230 is an ArangoDB® database, the vendor-neutral query command would be in ArangoDB® Query Language (AQL). If database 230 is a MySQL database, the vendor-neutral query command would be in Structured Query Language (SQL).

If the query path contained in the user request is a root path ("/"), keeper service 220 checks to see if the keeper service is up and running. The root path is for service health check of keeper service 220. Keeper service 220 does not interact with database 230. If the keeper service is healthy, keeper service 220 will return an indication to client application 220 indicating that the keeper service is healthy. Otherwise, keeper service 220 will return an indication indicating that it is not healthy.

If the query path contained in the user request is a config query path ("/configquery"), the body of the user request further contains a query label. Keeper service 220 checks if the query label is one of the predefined query labels. Predefined query label is a set of customized commands provided to client application 210 in order for CaaS platform users to easily perform certain database queries. For example, a predefined query label "New300" is a customized command corresponding to one or more database query commands designed to retrieve a list of 300 new containers that have been recently created in a worker node. If keeper service 220 determines that the query label contained in the user request is not one of the predefined query labels, keeper service 220 will generate an indication to client application 210 indicating the same. If it is determined that the query label in the user request is one of the predefined query labels, keeper service 220 will translate the user request into vendor-neutral query commands using the corresponding database query commends specifically designed for that query label. A list of each query label and its corresponding database query commands may be stored internally in keeper service 220. In some examples, the list may be stored externally and visible to CaaS users, so that the users may review, optimize and validate the query performance.

If the query path contained in the user request is an open query path ("/openquery"), the body of the user request may further contain one or more native database query commands. Keeper service 220 first checks if the open query function is available for a client application to call. Keeper service 220 keeps an internal flag to track whether the open query function is available. The internal flag has only two toggle positions: ON and OFF. The default position is OFF. The flag can only be turned ON or OFF by the system administrator of keeper service 220. If the flag is ON, the open query function is available to users. If the flag is OFF, the function is not available to users.

Keeper service 220 validates the availability of the open query function by checking the position of the internal flag. If the flag is OFF, keeper service 220 will generate an indication to client application 220 indicating that the open query path is not available. If the flag is ON, keeper service 220 will translate the user request into vendor-neutral query commands using the native database query commands contained in the request body. In some examples, only database read query commands are being translated and allowed.

If the query path contained in the user request is an update path ("/update"), the body of the user request further contains one or more native database query commands. Keeper service 220 first checks if the update function is available for a client application to call. Keeper service 220 keeps another internal flag to track whether the update function is available. The internal flag has only two toggle positions: ON and OFF. The default position is OFF. The flag can only be turned ON or OFF by the system administrator of keeper service 220. If the flag is ON, the update function is available to users. If the flag is OFF, the function is not available to users.

Keeper service 220 validates the availability of the update function by checking the position of the internal flag. If the flag is OFF, keeper service 220 will generate an indication to client application 220 indicating that the update path is not available. If the flag is ON, keeper service 220 will translate the user request into vendor-neutral query commands using the native database query commands contained in the request body. In some examples, insert and update query commands are allowed. The update path may be used to insert new data or modify existing data stored in database 230.

The open query path and the update path may be used for database debugging and development actions. For example, developers of database 230 can use this function to create and test new schema in the database, test out different database queries to see the output, and create and modify test data in the database, etc. When the database is in final production, these paths should be switched off.

After the user request is translated into vendor-neutral query commands, keeper service 220 sends the query commands to database 230 for execution. The vendor-neutral query commands may provide access to database 230 using database query language, database command, database protocol, or application programming interface (API). In some examples, the result of the execution, e.g., the data retrieved in response to a read command, or the status of a write command, is sent back to keeper service 220. Keeper service 220 then responds to the user request by sending the result back to client application 210.

Figure 3:
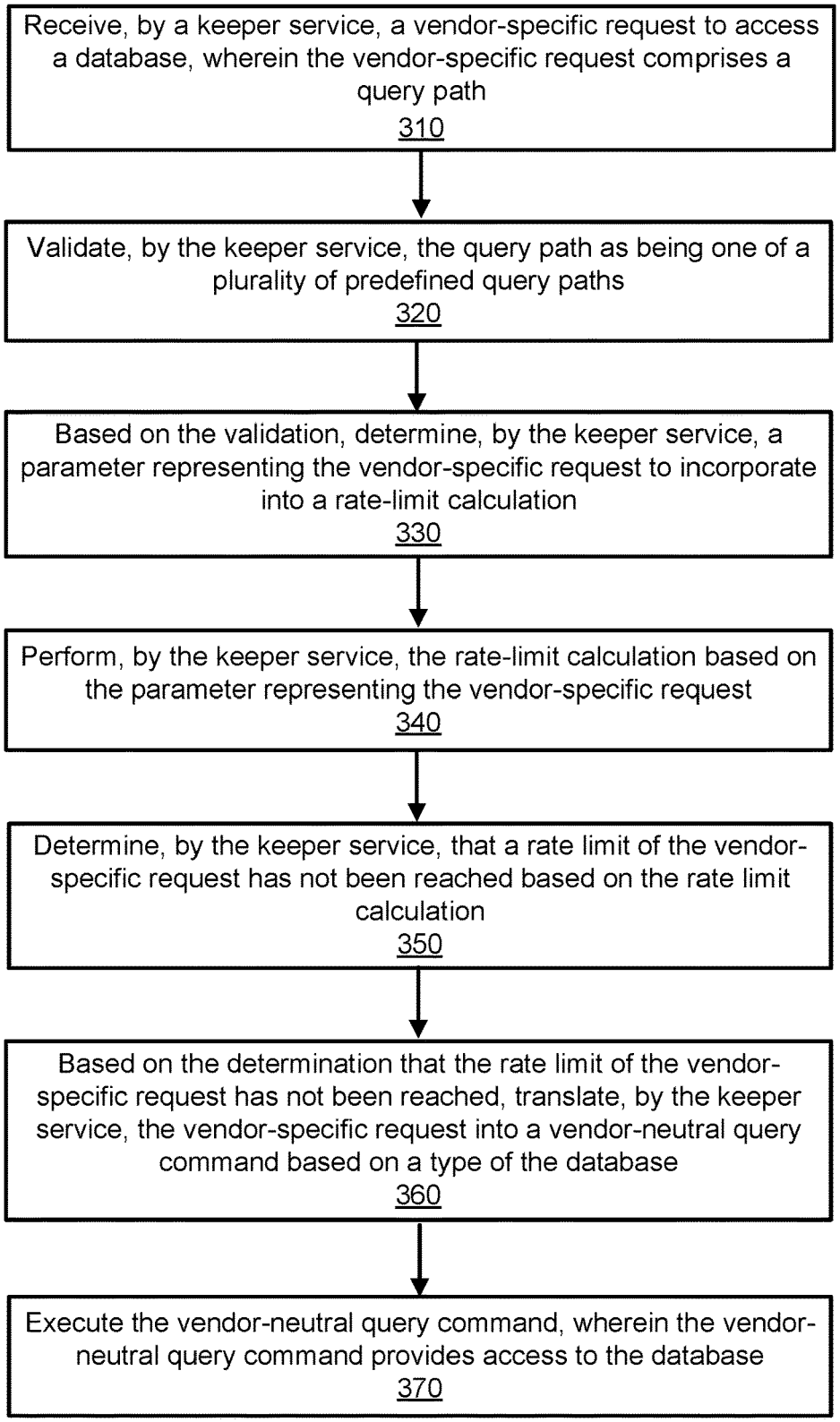
FIG. 3 illustrates a flow diagram of using rate-limited mechanism for querying a non-tabular database in accordance with an example.

FIG. 3 illustrates a flow diagram of using rate-limited mechanism for querying a non-tabular database in accordance with an example. Method 300 may be performed by a web server, a database server, a worker node or a manager node in a container orchestration engine. Method 300 may also be performed by other components in a container orchestration engine. It should be understood that the order of steps described below is not limited to the specific order disclosed, and that one or more steps may be omitted or repeated as long as the invention remains operable.

At step 310, a keeper service, receives a vendor-specific request to access a database, wherein the vendor-specific request comprises a query path. The vendor-specific request is from a CaaS platform user. If the vendor-specific request is in REST format, it contains at least one of the following:

an HTTP method, an endpoint path, headers and a request body. The endpoint path may contain a query path, which corresponds to a predefined function or service provided by the keeper service. The types of the query path may include: "/" for root path, "/configquery" for config query path, "/openquery" for open query path, and "/update" for update path. These paths are stored in a predefined query paths unit in the keeper resource on a non-transitory computer-readable medium. In some examples, the keeper service may include other predefined query paths.

At step 320, the keeper service validates the query path as being one of the predefined query paths. In this step, the keeper service checks if the query path is one of the predetermined query paths stored in predetermined query paths unit. If not, the keeper service will generate an indication indicating the same. If the query path is one of the predetermined query paths, the query path will be validated.

At step 330, based on the validation, the keeper service determines a parameter representing the vendor-specific request to incorporate into a rate-limit calculation. A parameter of the user request may include the type of the user request, the IP address of requester, the time lapse between each user request, or a total number of user requests received from the requester within a given timeframe, etc. Rate-limit calculation may calculate the amount of time between each user request received, or a total number of requests from all requesters within a given timeframe, etc.

At step 340, the keeper service performs the rate-limit calculation based on the parameter representing the vendor-specific request. At step 350, based on the rate limit calculation, the keeper service determines that a rate limit of the vendor-specific request has not been reached. The determination may be made if the rate limit does not exceed a predetermined rate-limit threshold. In some examples, the rate-limit threshold may be predetermined at 20 request per second (RPS).

At step 360, based on the determination that the rate limit of the vendor-specific request has not been reached, the keeper service translates the vendor-specific request into a vendor-neutral query command based on a type of the database. For example, if the type of the database is ArangoDB®, the vendor-neutral query command would be in ArangoDB® Query Language (AQL). The vendor-specific request is translated differently depending on the query path contained in the request, as discussed in more detail above.

At step 370, the vendor-neutral query command is executed, wherein the vendor-neutral query command provides access to the database. In this step, the keeper service sends the vendor-neutral query commands to the database for execution. In some examples, the result of the execution, e.g., the data retrieved in response to a read command, or the status of a write command, etc., is sent back to the keeper service. The keeper service then responds to the user request by sending the result back to the CaaS platform user.

Figure 4:
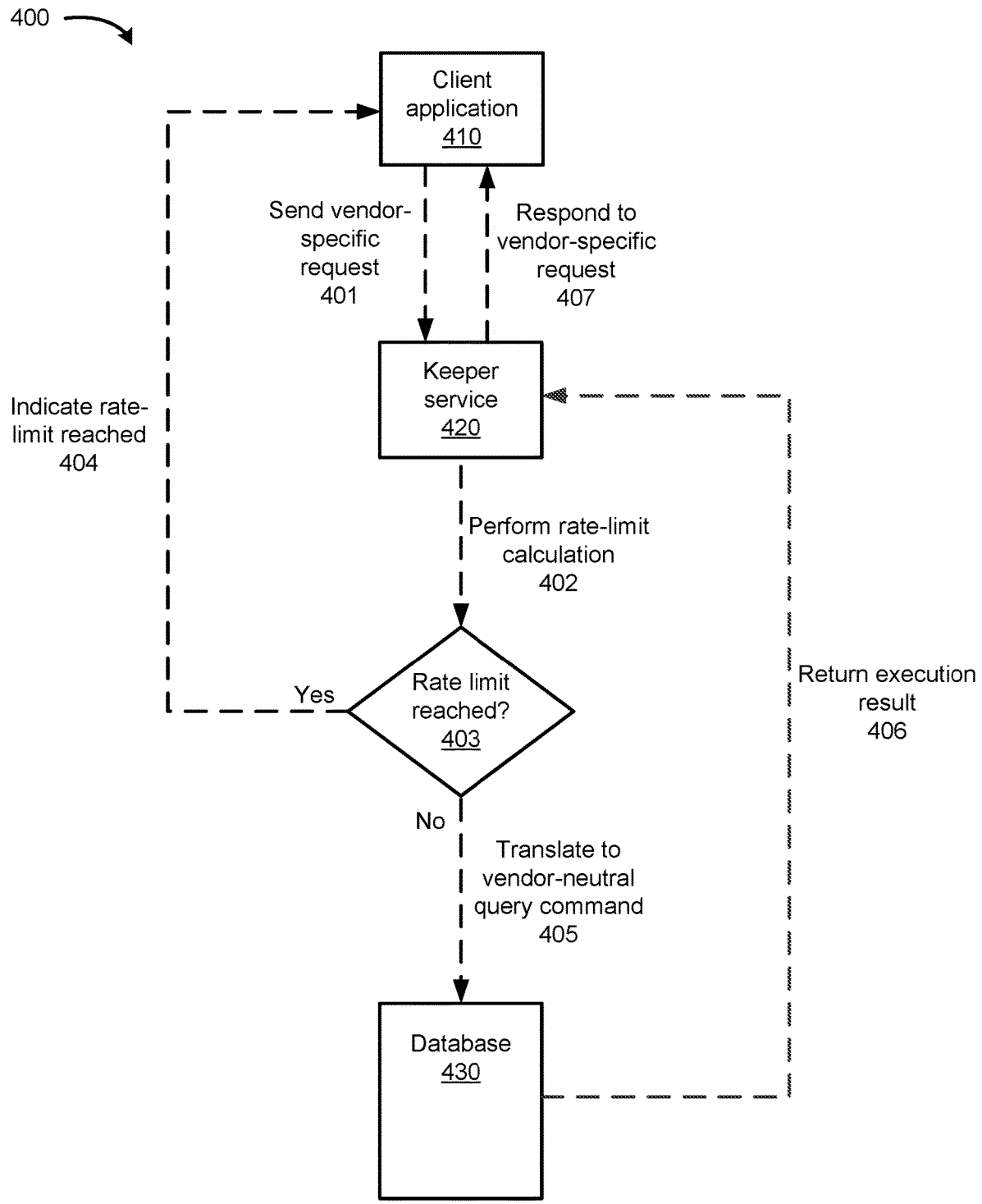
FIG. 4 illustrates a process flow of using rate-limited mechanism for querying a non-tabular database in accordance with an example.

FIG. 4 illustrates a process flow of using rate-limited mechanism for querying a non-tabular database in accordance with an example. Process flow 400 comprises client application 410, keeper service 420, and database 430. Client application may be used by CaaS platform users to access database 430 via keeper service 420. Keeper service 420 is an API service provider that provides client application 410 with a generic application programming interface for accessing database 430.

At process 401, client application 410 sends a vendor-specific request to keeper service 420 to access database 430. The vendor-specific request, if sent in REST format, contains at least one of the following: an HTTP method, an endpoint path, headers and a request body. The endpoint path contains a query path, which corresponds to a predefined function or service provided by the keeper service. The predefined query path may include: "/" for root path, "/configquery" for config query path, "/openquery" for open query path, and "/update" for update path. In some examples, the query path is validated by keeper service path if the query path is one of the predetermined query paths.

At process 402, keeper service 420 performs a rate-limit calculation based on the vendor-specific request. Keeper service 420 may calculate the amount of time between each user request received from client application 410, or a total number of requests from requesters within a given timeframe, etc.

At process 403, keeper service 420 determines, based on the rate-limit calculation, whether the rate limit has been reached. If the rate limit exceeds a predetermined rate-limit threshold, at process 404, a message is sent to client application 410 to indicate that the rate limit has been reached. If the rate limit has not been reached, at process 405, keeper service 420 translates the vendor-specific request into a vendor-neutral query command. The vendor-specific request may be translated differently depending on the query path contained in the request, as discussed in more detail above. Keeper service 420 then sends the vendor-neutral query commands to database 430 for execution.

In some examples, at process 406, database 430 returns the result of the execution, e.g., the data retrieved in response to a read command, or the status of a write command, etc., to keeper service 420. In some examples, at process 407, keeper service 420 responds to the vendor-specific request received in process 401 by sending the execution result back to client application 410.

Figure 5:
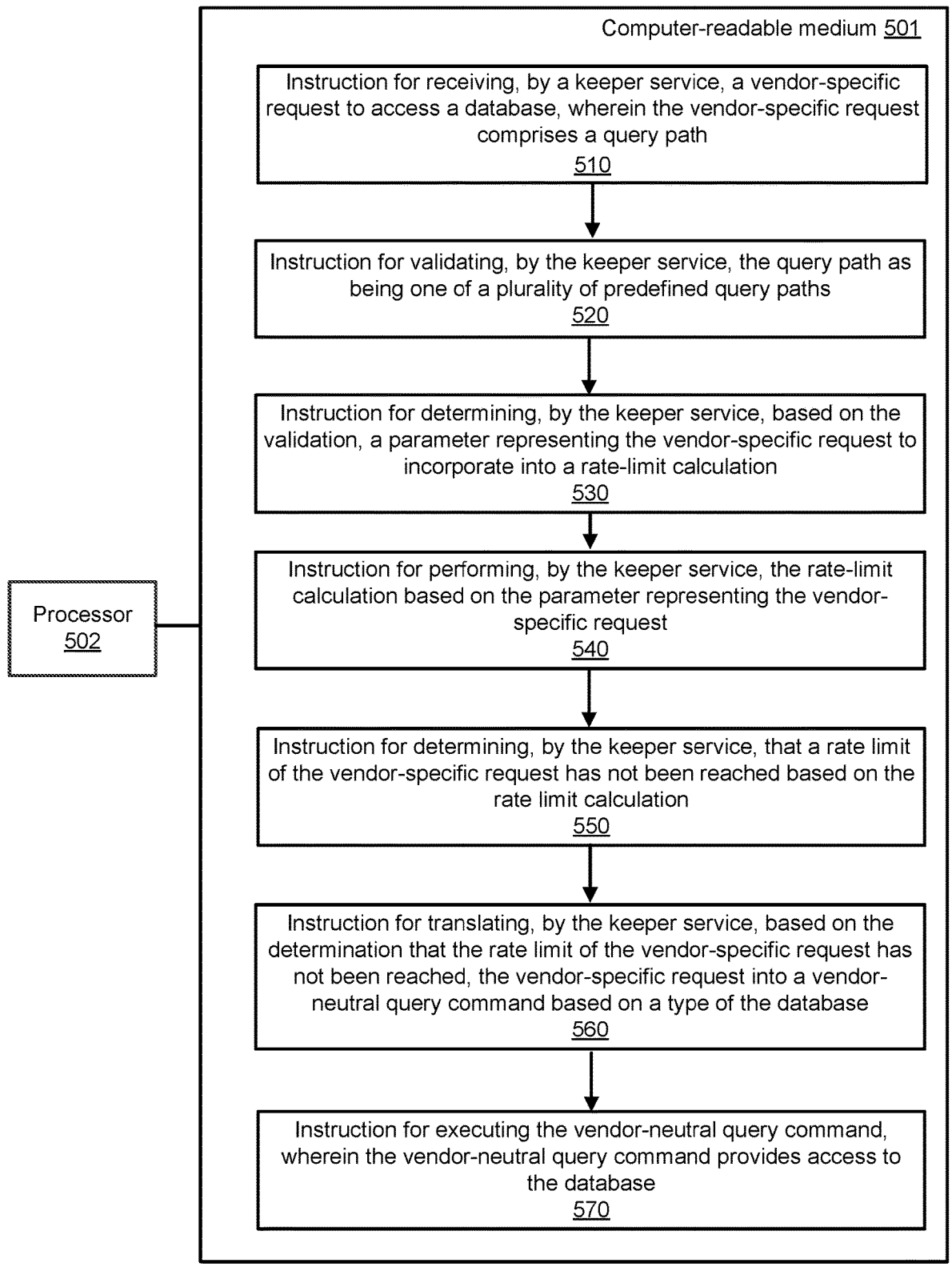
FIG. 5 illustrates a computer-readable medium in accordance with an example.

FIG. 5 illustrates a computer-readable medium in accordance with an example. In various examples, the instructions for performing the various methods herein are stored on a non-transitory computer-readable medium, e.g., computer readable medium (CRM) 501. Processor 502 is connected to CRM 501 to execute the instructions. FIG. 5 is shown from the perspective of instructions performed at a server for using rate-limited mechanism for querying a non-tabular database in a CaaS platform. For example, CRM 501 may include one or more instructions 510 for receiving, by a keeper service, a vendor-specific request to access a database, wherein the vendor-specific request comprises a query path. The vendor-specific request is from a CaaS platform user. The vendor-specific request may contain a query path, which corresponds to a predefined function or service provided by the keeper service. The types of the query path may include: "/" for root path, "/configquery" for config query path, "/openquery" for open query path, and "/update" for update path. In some examples, the keeper service may include other predefined query paths.

Instruction 520 comprises one or more instructions for validating, by the keeper service, the query path as being one of a plurality of predefined query paths. The keeper service checks if the query path is one of the predetermined query paths. If the query path is one of the predetermined query paths, the query path is validated CRM 501 may also include one or more instructions 530 for determining, by the keeper service, based on the validation, a parameter representing the vendor-specific request to incorporate into a rate-limit calculation. A parameter of the user request may include the type of the user request, the IP address of requester, the time lapse between each user request, or a total number of user requests received from the requester within a given timeframe, etc.

Instruction 540 comprises one or more instructions for performing, by the keeper service, the rate-limit calculation based on the parameter representing the vendor-specific request. Rate-limit calculation may be performed by calculating the amount of time between each user request received, or a total number of requests from all requesters within a given timeframe, etc.

Instruction 550 comprises one or more instructions for determining, by the keeper service, that a rate limit of the vendor-specific request has not been reached based on the rate limit calculation. The determination may be made if the rate limit does not exceed a predetermined rate-limit threshold. In some examples, the rate-limit threshold may be predetermined at 20 request per second (RPS).

Instruction 560 comprises one or more instructions for translating, by the keeper service, based on the determination that the rate limit of the vendor-specific request has not been reached, the vendor-specific request into a vendor-neutral query command based on a type of the database. For example, if the type of the database is ArangoDB®, the vendor-neutral query command would be in ArangoDB® Query Language (AQL). The vendor-specific request is translated differently depending on the query path contained in the request, as discussed in more detail above.

CRM 501 may also include one or more instructions 570 for executing the vendor-neutral query command, wherein the vendor-neutral query command provides access to the database. The keeper service sends the vendor-neutral query commands to the database for execution. In some examples, the result of the execution, e.g., the data retrieved in response to a read command, or the status of a write command, etc., is sent back to the keeper service. The keeper service then responds to the user request by sending the result back to the CaaS platform user.

Figure 6:
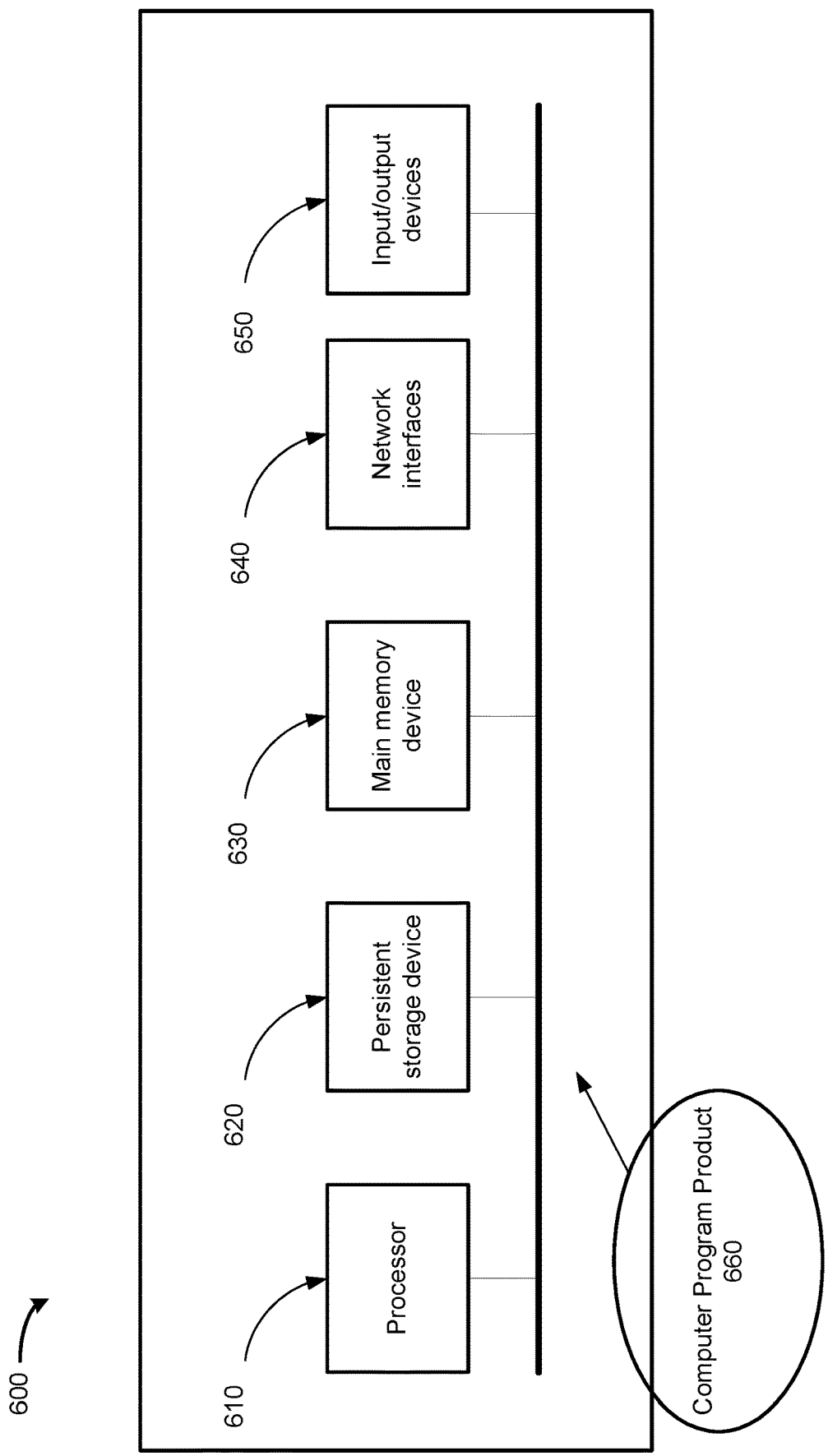
FIG. 6 illustrates a block diagram of a distributed computer system that can be used for implementing one or more aspects of the various examples.

FIG. 6 illustrates a block diagram of a distributed computer system that can be used for implementing one or more aspects of the various examples. Apparatus 600 comprises a processor 610 operatively coupled to a persistent storage device 620 and a main memory device 630. Processor 610 controls the overall operation of apparatus 600 by executing computer program instructions that define such operations. The computer program instructions may be stored in persistent storage device 620, or other computer-readable medium, and loaded into main memory device 630 when execution of the computer program instructions is desired. For example, client applications 210 and 410, keeper services 220 and 420, and databases 230 and 430, may comprise one or more components of apparatus 600. Thus, the various method steps of FIG. 3 herein can be defined by the computer program instructions stored in main memory device 630 and/or persistent storage device 620 and controlled by processor 610 executing the computer program instructions. For example, the computer program instructions can be implemented as computer executable code programmed by one skilled in the art to perform an algorithm defined by the method steps of FIG. 3 herein. Accordingly, by executing the computer program instructions, processor 610 executes an algorithm defined by the method steps herein. Additionally, or alternatively, instructions for implementing the method steps of FIG. 3 herein in accordance with disclosed examples may reside in computer program product 660. When processor 610 is executing the instructions of computer program product 660, the instructions, or a portion thereof, are typically loaded into main memory device 630 from which the instructions are readily accessed by processor 610.

Apparatus 600 also includes one or more network interfaces 640 for communicating with other nodes, client applications and databases in a CaaS platform via a network. Apparatus 600 may also include one or more input/output devices 650 that enable user interaction with apparatus 600 (e.g., a display, a keyboard, a mouse, speakers, buttons, etc.).

Processor 610 may include both general and special purpose microprocessors and may be the sole processor or one of multiple processors of apparatus 600. Processor 610 may comprise one or more central processing units (CPUs), and one or more graphics processing units (GPUs), which, for example, may work separately from and/or multi-task with one or more CPUs to accelerate processing. Processor 610, persistent storage device 620, and/or main memory device 630 may include, be supplemented by, or incorporated in, one or more application-specific integrated circuits (ASICs) and/or one or more field programmable gate arrays (FPGAs).

Persistent storage device 620 and main memory device 630 each comprise a tangible non-transitory computer readable storage medium. Persistent storage device 620, and main memory device 630, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 650 may include peripherals. For example, input/output devices 650 may include a display device such as a cathode ray tube (CRT), plasma or liquid crystal display (LCD) monitor for displaying information (e.g., a list of requests from client applications in a CaaS platform) to a user, a keyboard, and a pointing device such as a mouse or a trackball by which the user can provide input to apparatus 600.

Any or all of the systems and apparatuses discussed herein, including client applications 210 and 410, keeper services 220 and 420, and databases 230 and 430, may be performed by, and/or incorporated in, an apparatus such as apparatus 600.

One skilled in the art will recognize that an implementation of an actual computer or computer system may have other structures and may contain other components as well (e.g., batteries, fans, motherboards, power supplies, etc.), and that FIG. 6 is a high-level representation of some of the components of such a computer for illustrative purposes.

The various examples are described herein with reference to the accompanying drawings, which form a part hereof, and which show, by way of illustration, specific ways of practicing the examples. This specification may, however, be construed in many different forms and should not be construed as being limited to the examples set forth herein; rather, these examples are provided so that this specification will be thorough and complete, and will fully convey the scope of the examples to those skilled in the art. Among other things, this specification may be implemented as methods or devices. Accordingly, any of the various examples herein may take the form of an entirely hardware example, an entirely software example or an example combining software and hardware aspects. The specification is, therefore, not to be taken in a limiting sense.

Throughout the specification and claims, the following terms take the meanings explicitly associated herein, unless the context clearly dictates otherwise:

The phrase "in an example" as used herein does not necessarily refer to the same example, though it may. Thus, as described above, various examples may be readily combined, without departing from the scope or spirit thereof.

As used herein, the term "or" is an inclusive "or" operator and is equivalent to the term "and/or," unless the context clearly dictates otherwise.

The term "based on" is not exclusive and allows for being based on additional factors not described, unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

In addition, throughout the specification, the meaning of "a", "an", and "the" includes plural references, and the meaning of "in" includes "in" and "on".

Although some of the various examples presented herein constitute a single combination of inventive elements, it should be appreciated that the inventive subject matter is considered to include all possible combinations of the disclosed elements. As such, if one example comprises elements A, B, and C, and another example comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

Throughout the above discussion, numerous references have been made regarding servers, services, interfaces, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be realized as a computer program product comprising a non-transitory, tangible computer readable medium storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, server, device, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices, including servers, interfaces, systems, databases, agents, peers, controllers, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.), and may comprise various other components such as batteries, fans, motherboards, power supplies, etc. The software instructions configure or program the computing device to provide the roles, responsibilities, or other functionality as discussed below with respect to the disclosed apparatus. Further, the disclosed technologies can be realized as a computer program product that includes a non-transitory computer readable medium storing the software instructions that causes a processor to execute the disclosed steps associated with implementations of computer-based algorithms, processes, methods, or other instructions. In some examples, the various servers, systems, databases, or interfaces exchange data using standardized protocols or algorithms, possibly based on HTTP, HTTPS, AES, public-private key exchanges, web service APIs, or other electronic information exchanging methods. Data exchanges among devices can be conducted over a packet-switched network, the Internet, LAN, WAN, VPN, or other type of packet switched network; a circuit switched network; cell switched network; or other type of network.

The foregoing specification is to be understood as being in every respect illustrative, but not restrictive, and the scope of the examples disclosed herein is not to be determined from the specification, but rather from the claims as interpreted according to the full breadth permitted by the patent laws. It is to be understood that the examples shown and described herein are illustrative of the principles of the present disclosure and that various modifications may be implemented by those skilled in the art without departing from the scope and spirit of the disclosure. Those skilled in the art could implement various other feature combinations without departing from the scope and spirit of the disclosure.

The invention claimed is:

1. A system comprising:
at least one memory having computer-readable instructions stored thereon which, when executed by at least one processor coupled to the at least one memory, causes the at least one processor to:
receive, by a keeper service, a vendor-specific request to access a database, wherein the vendor-specific request comprises a query path;
validate, by the keeper service, the query path as being one of a plurality of predefined query paths;

based on the validation, determine, by the keeper service, a parameter representing the vendor-specific request to incorporate into a rate-limit calculation;
perform, by the keeper service, the rate-limit calculation based on the parameter representing the vendor-specific request;
determine, by the keeper service, that a rate limit of the vendor-specific request has not been reached based on the rate limit calculation;
based on the determination that the rate limit of the vendor-specific request has not been reached, translate, by the keeper service, the vendor-specific request into a vendor-neutral query command based on a type of the database, wherein the vendor-specific request further comprises a query label, and wherein translating the vendor-specific request into the vendor-neutral query command comprises instructions to:
determine that the query label is one of a plurality of predefined query labels; and
translate the query label into the vendor-neutral query command based on the determination that the query label is one of the plurality of predefined query labels; and
execute the vendor-neutral query command, wherein the vendor-neutral query command provides access to the database.

2. The system of claim 1, further comprising instructions to generate an indication that the rate limit of the vendor-specific request has been reached.

3. The system of claim 1, wherein the rate limit of the vendor-specific request is a predetermined threshold.

4. The system of claim 1, further comprising instructions to generate an indication to a user of a denial-of-service attack based on the rate limit calculation.

5. The system of claim 1, further comprising instructions to generate an indication that the query path is not one of the plurality of predefined query paths.

6. The system of claim 1, wherein the database is a non-tabular database.

7. The system of claim 1, wherein the vendor-neutral query command provides access to the database using at least one of: a database query language, a database command, a database protocol, or an application programming interface (API).

8. A computerized method comprising:
receiving, by a keeper service, a vendor-specific request to access a database, wherein the vendor-specific request comprises a query path;
validating, by the keeper service, the query path as being one of a plurality of predefined query paths;
based on the validation, determining, by the keeper service, a parameter representing the vendor-specific request to incorporate into a rate-limit calculation;
performing, by the keeper service, the rate-limit calculation based on the parameter representing the vendor-specific request;
determining, by the keeper service, that a rate limit of the vendor-specific request has not been reached based on the rate limit calculation;
based on the determination that the rate limit of the vendor-specific request has not been reached, translating, by the keeper service, the vendor-specific request into a vendor-neutral query command based on a type of the database, wherein the vendor-specific request further comprises a query label, and wherein translating the query command further comprises:
determining that the query label is one of a plurality of predefined query labels; and
translating the query label into the vendor-neutral query command based on the determination that the query label is one of the plurality of predefined query labels; and
executing the vendor-neutral query command, wherein the vendor-neutral query command provides access to the database.

9. The method of claim 8, further comprising generating an indication that the rate limit of the vendor-specific request has been reached.

10. The method of claim 8, wherein the rate limit of the vendor-specific request is a predetermined threshold.

11. The method of claim 8, wherein the database is a non-tabular database.

12. The method of claim 8, wherein the vendor-neutral query command provides access to the database using at least one of: a database query language, a database command, a database protocol, or an application programming interface (API).

13. A non-transitory computer readable medium having computer-readable instructions stored thereon, which, when executed by at least one processor, cause the at least one processor to perform one or more steps comprising:
receiving, by a keeper service, a vendor-specific request to access a database, wherein the vendor-specific request comprises a query path;
validating, by the keeper service, the query path as being one of a plurality of predefined query paths;
based on the validation, determining, by the keeper service, a parameter representing the vendor-specific request to incorporate into a rate-limit calculation;
performing, by the keeper service, the rate-limit calculation based on the parameter representing the vendor-specific request;
determining, by the keeper service, that a rate limit of the vendor-specific request has not been reached based on the rate limit calculation;
based on the determination that the rate limit of the vendor-specific request has not been reached, translating, by the keeper service, the vendor-specific request into a vendor-neutral query command based on a type of the database, wherein the vendor-specific request further comprises a query label, and wherein translating the query command further comprises:
determining that the query label is one of a plurality of predefined query labels; and
translating the query label into the vendor-neutral query command based on the determination that the query label is one of the plurality of predefined query labels; and
executing the vendor-neutral query command, wherein the vendor-neutral query command provides access to the database.

14. The non-transitory computer readable medium of claim 13, further comprising generating an indication that the rate limit of the vendor-specific request has been reached.

15. The non-transitory computer readable medium of claim 13, wherein the rate limit of the vendor-specific request is a predetermined threshold.

16. The non-transitory computer readable medium of claim 13, wherein the database is a non-tabular database.

17. The non-transitory computer readable medium of claim 13, wherein the vendor-neutral query command provides access to the database using at least one of: a database query language, a database command, a database protocol, or an application programming interface (API).

* * * * *